(12) United States Patent
Robinson

(10) Patent No.: US 6,321,492 B1
(45) Date of Patent: Nov. 27, 2001

(54) ENERGY ABSORBER

(75) Inventor: William Henry Robinson, Eastbourne (NZ)

(73) Assignee: Robinson Seismic Limited, Wellington (NZ)

( * ) Notice: Subject to any disclaimer, the term of this patent is extended or adjusted under 35 U.S.C. 154(b) by 0 days.

(21) Appl. No.: 09/463,943
(22) PCT Filed: Aug. 10, 1998
(86) PCT No.: PCT/NZ98/00117
  § 371 Date: Mar. 6, 2000
  § 102(e) Date: Mar. 6, 2000
(87) PCT Pub. No.: WO99/07966
  PCT Pub. Date: Feb. 18, 1999

(30) Foreign Application Priority Data

Aug. 8, 1997 (NZ) ........................ 328521

(51) Int. Cl.⁷ ............... E04B 1/98; E04H 9/02
(52) U.S. Cl. ............ 52/167.1; 52/167.4; 52/167.5; 52/167.6
(58) Field of Search ............ 52/167.1, 167.4, 52/167.5, 167.6, 167.7, 167.9; 248/636; 14/73.5

(56) References Cited

U.S. PATENT DOCUMENTS

| | | |
|---|---|---|
| 2,014,643 * | 9/1935 | Bakker .................... 52/167.5 |
| 4,496,130 | 1/1985 | Toyama . |
| 4,514,941 * | 5/1985 | Flores .................... 52/167.5 |
| 4,644,714 | 2/1987 | Zayas . |
| 4,726,161 | 2/1988 | Yaghoubian . |
| 5,071,261 | 12/1991 | Stive . |
| 5,081,806 * | 1/1992 | Pommelet ............ 52/167.1 |
| 5,599,106 | 2/1997 | Kemeny . |
| 5,797,728 * | 8/1998 | Kemeny ............... 52/167.7 |
| 6,085,474 * | 7/2000 | Mizuno ................ 52/167.5 |

FOREIGN PATENT DOCUMENTS

| | | |
|---|---|---|
| 290464 | 5/1991 | (DE) . |
| 194963 | 1/1985 | (NZ) . |
| 236812 | 4/1998 | (NZ) . |
| WO97/48866 | 12/1997 | (WO) . |

* cited by examiner

Primary Examiner—Carl D. Friedman
Assistant Examiner—Jennifer I. Thissell
(74) Attorney, Agent, or Firm—Jacobson Holman, PLLC

(57) ABSTRACT

The invention described is a system for seismic isolation or vibration of structures which is simple, relatively inexpensive and readily used for smaller structures. It involves use of bearings comprising a ball (10) and ball seats (12, 18) interposed between the structure and its foundation. Either the ball itself (24) or the seat surface (15) on which it rolls is compressible, the resistance to that compression providing a frictional braking force resisting rolling of the ball. This serves to dampen relative movement between the structure and its foundation. There are described several alternative constructions of the friction ball which is the preferred central element in the bearing device. There may be a plurality of balls (44, 47) in each combination of balls and seats.

15 Claims, 4 Drawing Sheets

ENERGY ABSORBER

TECHNICAL FIELD

This invention relates to a frictional braking device. More particularly it relates to a friction ball primarily intended to be used in seismic and vibration isolation.

BACKGROUND ART

Seismic isolation involves isolating structures and damping the isolated structures from incoming forces due to earthquakes. New Zealand Patent 178949 describes a very successful bearing which may be used to isolate structures in this way. The favoured embodiment of this invention is referred to as a lead rubber bearing. A more comprehensive discussion of seismic isolation and the lead rubber bearing can be found in "An Introduction to Seismic Isolation", Skinner et, John Wylie and Sons (1993).

Another means of seismically isolating structures is a bearing sold under the trade mark "Frictional Pendulum" by Earthquake Protection Systems Inc, of Alameda, Calif., USA. Such a bearing consists of a pendulum member with a frictional surface at the distal end of the pendulum member which slides over a polished surface. This is described in U.S. Pat. No. 4,644,714.

Another device intended to provide seismic isolation is described in the U.S. Pat. No. 4,726,161. This apparatus includes a rollable bearing and a bowl. A spring urges the rollable bearing into contact with the bowl. The combination dampens seismic forces on a structure supported on said rollable bearing.

In U.S. Pat. No. 5,599,106 there is described a seismic isolating bearing. This consists in upper and lower load plates with downward and upward facing rigid surfaces, respectively, at least one of which is conical. A rigid ball is sandwiched between the plates. The ball rolls up a conical surface when one load plate is displaced laterally from the other by an external force, and returns to the centre of the core by gravitational forces when the external force ceases.

The invention described in WO97/48866 is a seismic isolator consisting of a ball interposed between a foundation and a building. The ball is retained in a cage like structure secured to the underside of the building. It rolls on a hemispherical surface secured to the foundation.

In all of the prior art devices described above the bearing element, or ball, and the surfaces on which it rolls are substantially incompressible. This means that when there is relative movement between the structure being supported and the surface upon which the bearing rests there is no braking force being applied apart from the weight of the structure itself. If the incoming forces causing relative movement are long lasting then it can take a considerable amount of time for the structure to come to rest.

It is an object of this invention to go some way towards overcoming this disadvantage or at least to offer the public a useful choice.

DISCLOSURE OF INVENTION

Accordingly the invention may be said broadly to consist in an external force damping bearing assembly comprising:

an upper surface which in use supports a structure, a lower surface co-operable with said upper surface, and a friction ball which in use is positioned between said upper surface and said lower surface to support said structure, said friction ball comprising a core of particulate material and an outer layer enclosing said core, said ball, when supporting said structure, being deformed, said deformation generating frictional forces between particles of said particulate material which resists rolling motion within said ball to dampen an external force applied to said lower surface or to said upper surface.

In one alternative said external force is a seismic force acting on said lower surface.

In another alternative said external force is a wind force acting on said upper surface through said structure.

Preferably said particular material is a plurality of small friction balls of construction as defined herein and of diameters sufficiently small that a plurality of said friction balls fit within said core.

More particularly said particulate material is sand, quartz, glass, steel, metal balls or spherical or non-spherical balls.

Preferably said core is partly filled with material.

Alternatively said core is completely filled with material.

In a third alternative said core is filled to a hydrostatic pressure of 0–5 MPa.

Alternatively said core is filled to a hydrostatic pressure of up to 20 MPa.

Alternatively said core is filled to a hydrostatic pressure of up to the structural limit of said outer layer.

Preferably said outer layer comprises rubber.

More preferably said rubber outer layer is reinforced rubber.

Preferably said rubber is reinforced with fibre, metal wire, carbon fibre, cord, rubber thread or the like.

In another embodiment said friction ball has a laminated construction comprising two or more laminae surrounding a central core.

In one embodiment the outer surface of said friction ball is an elastomer with a high coefficient friction.

In another embodiment said outer layer is rubber with a tread.

In another embodiment said outer layer has a treadless but roughened surface.

Preferably the shape of said friction ball is any geometrical shape capable of rolling motion.

Preferably the undeformed shape of said friction ball is spherical.

Alternatively said undeformed shape is elliptical.

Alternatively said undeformed shape is ellipsoidal.

Preferably at least one of said upper and lower surfaces is concave or conical.

More preferably both said surfaces are concave.

Preferably said concave surface may be spherical, parabolic or defined by a polynomial, trigometrical or hyperbolic function or any other smooth curve or combination of curves.

Alternatively said surface is conical.

Preferably there is a rest in said concave or conical surface adapted to receive a said friction ball.

Preferably said rest is concave with a radius of curvature less than that of said concave surface.

Preferably a said lower surface mountable on a foundation member.

Preferably said foundation member is a pile.

More preferably said foundation member is an internal or external basement wall.

Preferably a said upper surface is mountable on the bottom of a structure to be supported thereby.

Alternatively said upper surface is an integral part of said structure.

In a further alternative there are a plurality of said friction balls resting on each said lower surface.

In one embodiment there are three said friction balls.

In another embodiment there are seven said friction balls.

Preferably there is a rest within said lower concave surface to receive said plurality of friction balls, the rest being shaped so that the upper surfaces of said balls contact said upper surface evenly over the contact area of each of said balls.

In another embodiment the invention may be said broadly to consist in a method of seismically isolating a structure which comprises interposing a plurality of bearing assemblies (as herein above defined) between a structure and a predetermined number of foundation points upon which said lower surfaces are positioned.

In one alternative said bearing assemblies are installed at the time of construction of said structure.

In another embodiment said bearing assemblies are retrofitted between an existing structure and its foundation.

Preferably said bearing assemblies are provided above all foundation members.

Preferably said foundation members are piles.

Alternatively said foundation members are perimeter or internal walls.

Preferably said structure is a house.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

BRIEF DESCRIPTION OF THE DRAWINGS

One preferred form of the present invention will now be described with reference to the accompanying drawings in which.

MODES OF CARRYING OUT THE INVENTION

Figure 1:
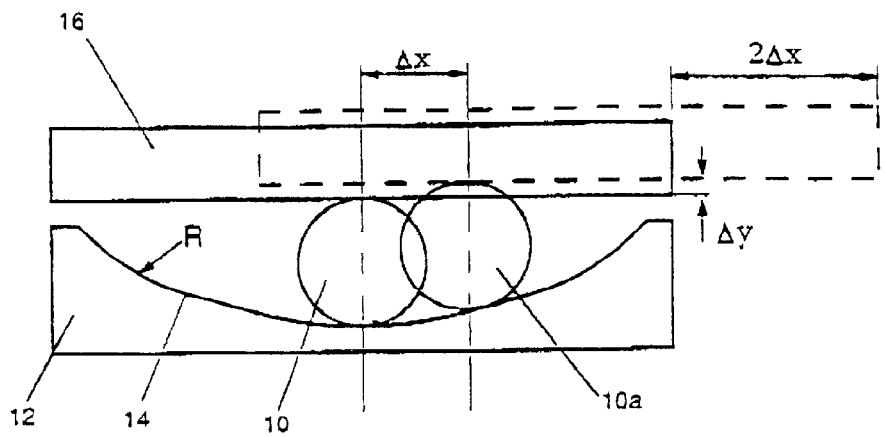
FIG. 1 is a schematic diagram of a structure, a surface and a ball illustrating their relative motions on a theoretical basis.

One of the practical impediments to inserting bearings under smaller structures to isolate them seismically is the need to allow for sufficient travel of the structure in relation to the foundation so that damping can take place. In FIG. 1 there is illustrated a lower seat 12 with a curved upper surface 14 upon which a ball 10 rests. For the purposes of this illustration ball 10 is not deformed, whereas in the embodiment according to the invention ball 10 is deformed. A structure 16 or a portion of a structure 16 rests on top of ball 10. As structure 16 is moved from left to right to the position shown in ghost in FIG. 1, ball 10 moves to the position 10a up the curve of surface 14 of radius R. Because each of the top and bottom of ball 10 is in contact with a surface the net effect on member 16 is that it will have moved horizontally a distance $2\Delta x$ as illustrated at the same time that ball 10a has moved horizontally a distance $\Delta x$ and vertically a distance $\Delta y$. The mechanical advantage achieved by a rolling ball is used in the concept of a friction ball according to the invention to allow for relative movement between a structure and its foundation during incoming forces due to earthquakes.

Figure 2:
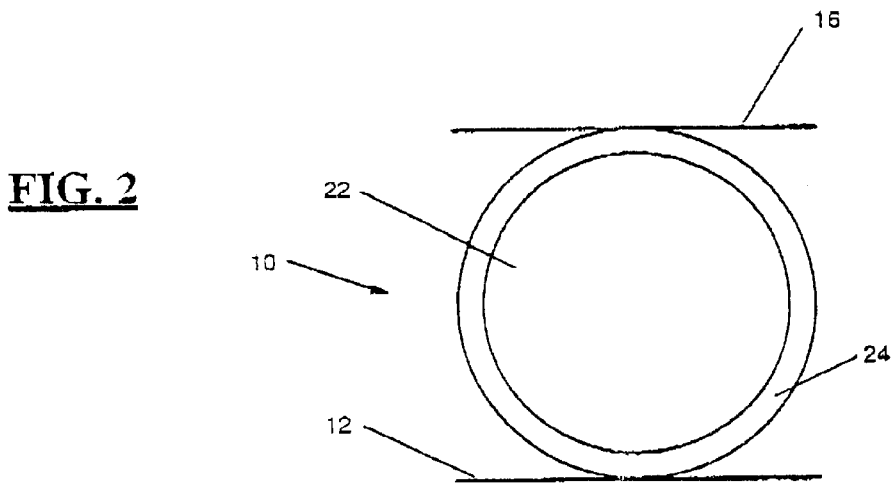
FIG. 2 is a schematic sectional view of a ball interposed between a pair of seats.
Figure 3:
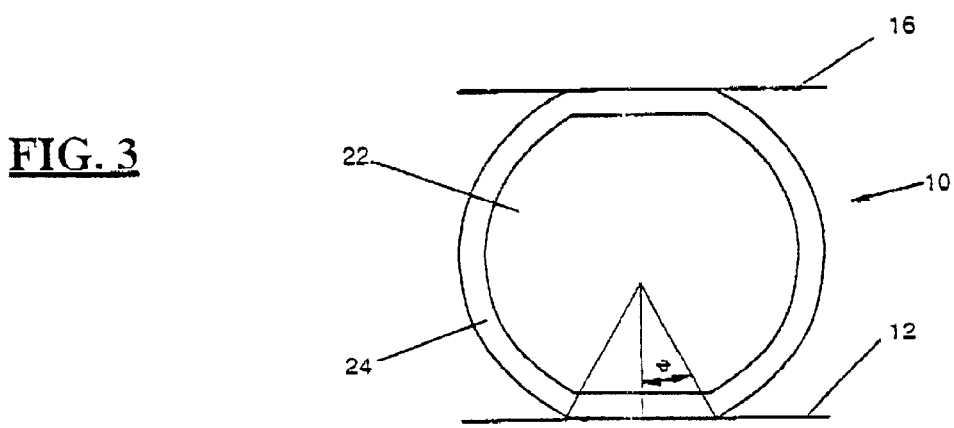
FIG. 3 is a sectional view of one embodiment of a friction ball according to the invention at rest and deformed by the weight of a structure resting thereupon.

In FIGS. 2 and 3 there is illustrated a friction ball 10 according to the invention. In FIG. 2 it is shown in an undeformed condition. In FIG. 3 it is shown in a deformed condition which it would assume when a structure was resting upon it. In the embodiment of FIGS. 2 and 3 the friction ball consists of a central core 22 and an outer layer 24.

A vast number of alternative materials can be used in the construction of the friction ball. The first property of the friction ball which allows it to be used in seismic isolation is that it must be deformable under the weight of a structure which it is intended to isolate seismically. The second property is that in the condition of deformation frictional forces within the friction ball are enhanced so as to resist rolling motion.

In the construction illustrated with reference to FIGS. 2 and 3, the outer layer 24 is preferably made of an elastomer, most preferably rubber. Its purpose and function is very similar to that of a tire tread on a vehicle tire. Thus, materials which are suitable in the construction and reinforcement of tire treads are equally suitable to the outer layer 24. The outer layer 24 may be provided with a tread or it may be treadless but with a roughened surface to enhance friction between the surface and the seats upon which it will rest. The outer layer may be reinforced with materials such as various fibres, metal wire, carbon fibre and rubber thread.

The core 22 can consist of a number of materials. Preferably it consists of particulate material such as sand, quartz particles, glass beads, steel balls, concrete balls or metal balls. The material can be of regular geometric shape or of non-geometric shape. The main criterion is that when the friction ball 10 is deformed the particulate matter is compressed in such a way that the interparticle frictional forces are increased.

In one preferred alternative embodiment the particulate material in core 22 can be a plurality of friction balls. The friction balls may be of the same construction as is described hereinabove. That is they can be solid or a core surrounded by an outer layer or laminated. However, for use as particulate material they will of course have a much smaller diameter than the friction ball made up of a plurality of friction balls within the core. The friction balls may be of the uniform or non-uniform diameter and shape so long as they meet the other criteria described herein.

The core 22 can be of a compressible solid material such as lead, concrete, wood, rubber or metal which in conjunction with the deformation of the outer layer would increase frictional forces thus resisting rolling of the ball.

The core may be partly filled or totally filled to hydrostatic pressures up to, for example, 20 MPa. It will be appreciated that the pressure on the core will be increased when it is deformed by the weight of the structure resting upon it and the outer layer 24 should be constructed accordingly.

In one embodiment the friction ball may be of a homogeneous construction of for example, solid rubber or other elastomer.

The shape of the ball is not critical provided it is capable of rolling between a structure and a seat. The simplest form of ball is spherical. However, it could be elliptical (an ellipse in one plane and circular in the other), ellipsoidal (ellipse in two planes with the same or different major and minor axis) or other similar shape. The ball may have any smooth or non-smooth surface to give the required force displacement function. The ball may have a flat or a flattened surface and a rough or a smooth surface.

Figure 6:
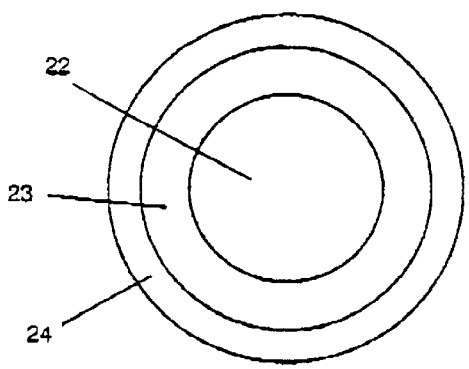
FIGS. 6 and 7 are cross-sectional views of laminated embodiments of friction balls according to the invention.
Figure 7:
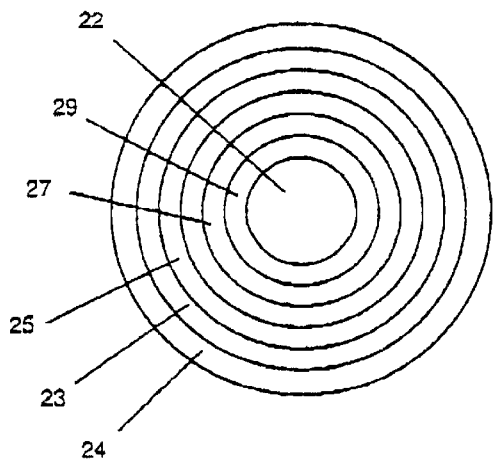

Referring to FIGS. 6 and 7, friction balls according to the invention may consist of a core 22 and an outer layer 24 and interposed therebetween a series of layers 23, 25, 27 and 29. Each of the interposed layers may be of solid or particulate material and may or may not be deformable provided that the overall structure is deformable and in the state of deformation increases resistance to rolling over that of undeformed friction ball.

Friction balls may be made of relatively inexpensive materials. This is of particular advantage in under developed countries which are subject to earthquakes. A friction ball could be made by filling the inside of a soccer ball with sand. Alternative relatively inexpensive materials such as animal skins can similarly be filled with granular materials such as sand or gravel in such circumstances.

Figure 4:
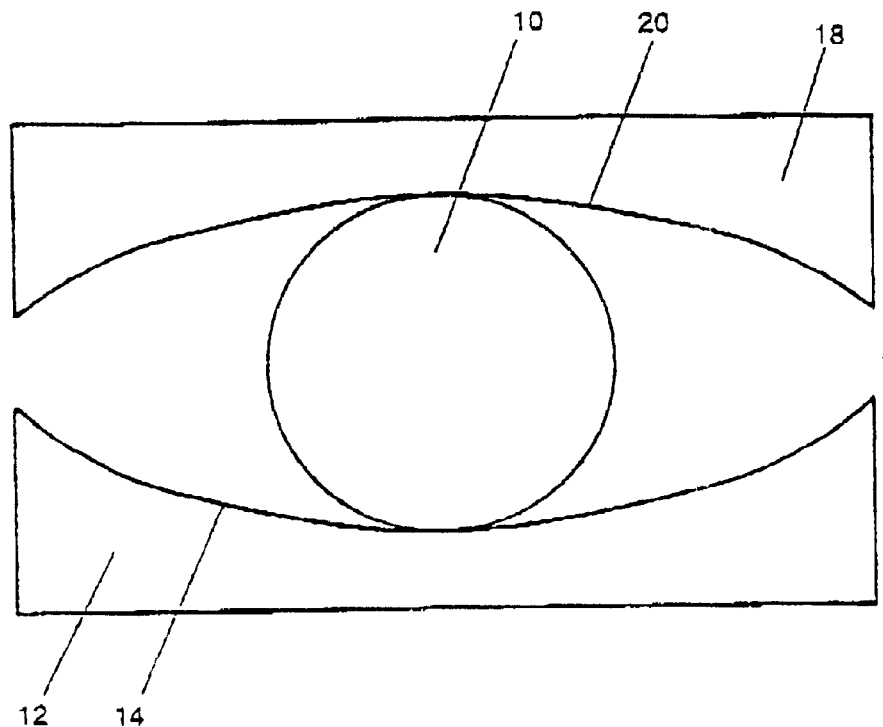
FIG. 4 is a schematic view of concave upper and lower seats according to a preferred embodiment of the invention.
Figure 5:
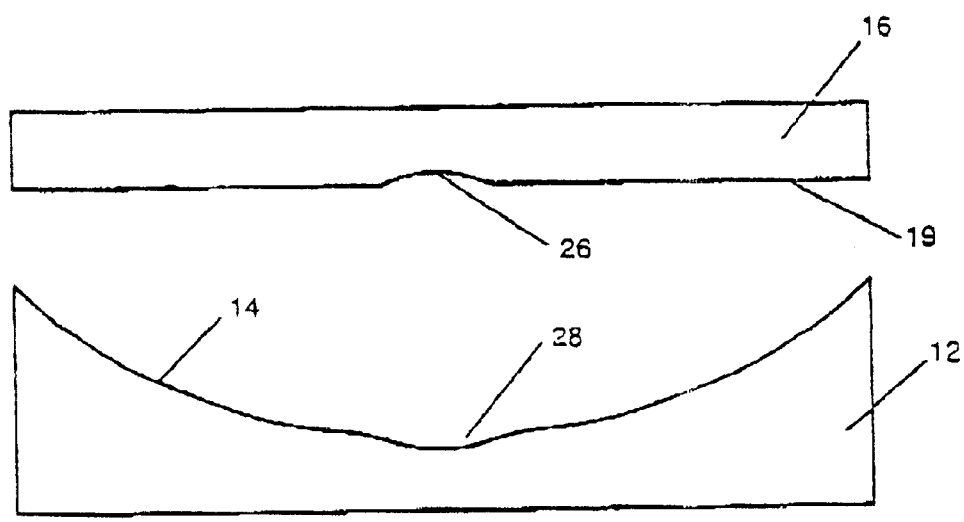
FIG. 5 is a schematic sectional view of upper and lower seats according to an embodiment of the invention with a pair of rests.

In FIGS. 4 and 5 there are illustrated seats in which the friction ball will be positioned. In FIG. 4 a representative ball 10 (which would be deformed when a structure is placed on upper seat 18) is positioned between an upper seat 18 and a lower seat 12. The upper face of ball 10 rests against the curved lower surface 20 of upper seat 18. The lower face of ball 10 rests on the curved upper surface 14 of lower seat 12.

The surfaces 20 and 14 of the seats 18 and 12 respectively can be of any curved shape such as spherical, parabolic or the like. It can also be conical in shape, the conical shape being particularly helpful in self centering friction balls when they come to rest.

In the embodiment in FIG. 5 a seat 16 having a substantially flat lower surface 19 has a rest or curved indented portion 26. An opposing seat 12 with a concave upper face 14 also has a curved indented rest 28. When the friction ball 10 is in the rests 26 and 28 the structure is in the desired centred position. In the preferred embodiment the friction ball 10 will be sufficiently deformable that it will deform to the shape of the rests 26 and 28 when in the centred position as described.

Figure 8:
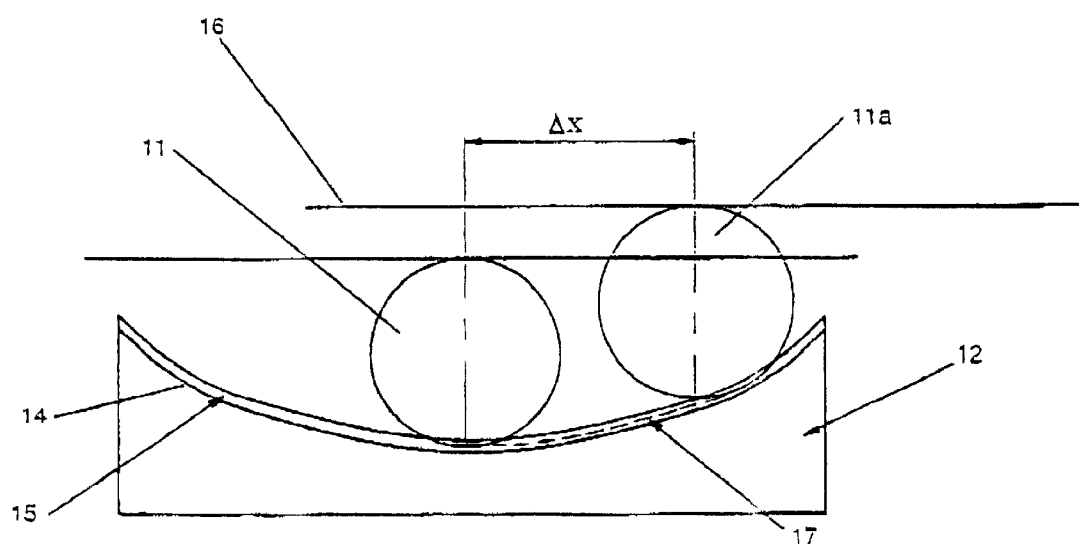
FIG. 8 is a schematic diagram of a structure, a seat and a ball according to the invention in which the frictional deformation is provided primarily in the seat component.

The rolling resistance frictional forces used to create seismic isolation according to the invention can be applied by deformation occurring in either the frictional ball or in the seat. Referring to FIG. 8 in such an embodiment a seat 12 having a substantially spherical surface 14 is provided with a deformable layer 15. Layer 15 is made of deformable material as described in relation to a friction ball in the other embodiments of the invention. In the embodiment of FIG. 8 a ball 11 is substantially non-deformable. It deforms the layer 15 to a depth shown by the dotted line 17. During relative movement between the seat and the structure 16 resting on ball 11 as it moves to position 11a. The frictional forces within the layer 15 resist the rolling movement so that the structure 16 moves only the distance Δx shown in FIG. 8 before the frictional resistance stops rotation of the ball in position 11a.

When the friction ball according to the invention is to be used in seismic isolation the points where the structure to be seismically isolated rests on its foundation are selected. Preferably upper and lower seats and a friction ball are installed at each such site. It is possible to install the friction ball on one seat only but it is preferred that there be a seat at either side. It is also preferred that the seat on either side has a rest 26 and 28 as shown in FIG. 5. The seats may be made of any suitable solid material such as moulded concrete or wood or the like.

If a structure is displaced in such a manner that one or more friction balls do not return to the rests 26 and 28 the building can be moved mechanically to return it to its centred position.

A further variation of the invention is the provision of a plurality of balls between the upper and lower seats of a ball and seat combination. These are illustrated in FIGS. 9 and 10.

Figure 9:
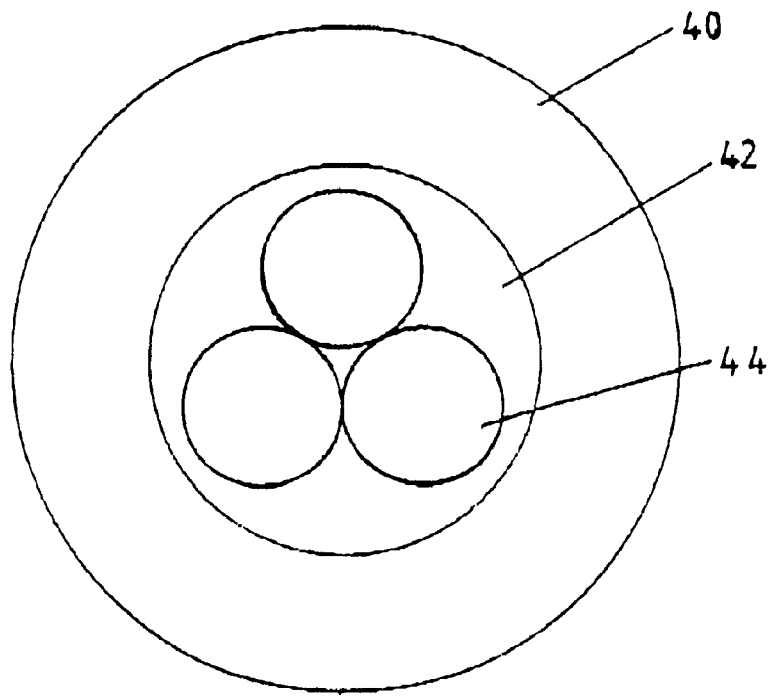
FIG. 9 is a plan view of a lower seat on which three friction balls are provided.
Figure 10:
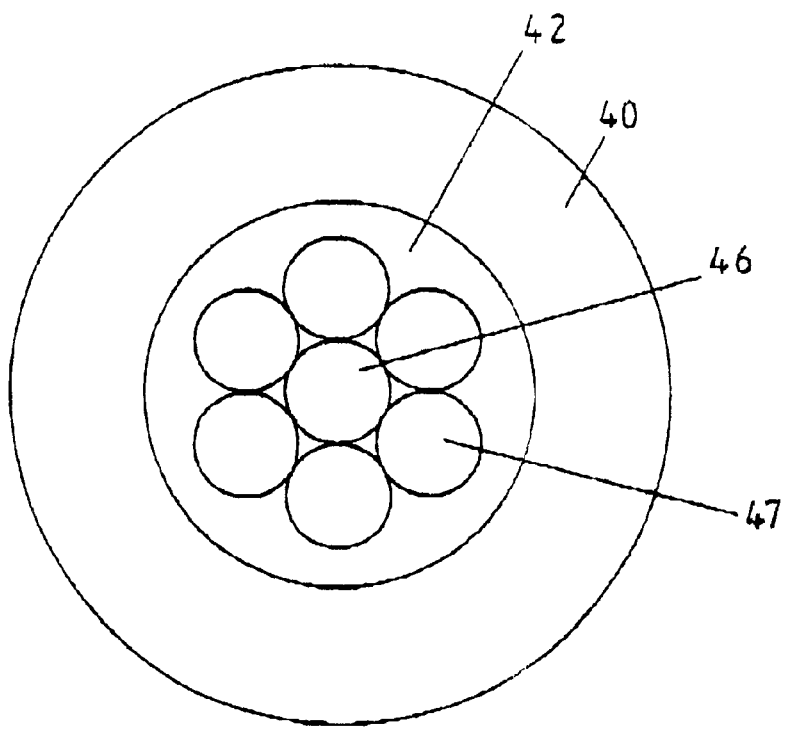
FIG. 10 is a plan view of a lower seat on which seven friction balls are provided.

The seat 40 in each of FIGS. 9 and 10 is similar to the lower seat illustrated in each of FIGS. 4, 5 and 8. There is provided an indented rest 42 (similar to rest 28 in FIG. 5) having a radius of curvature which is less than that of the concave upper surface of seat 40. In FIG. 9 there are three friction balls 44 in the indented rest 42. In FIG. 10 there are seven such balls 46 and 47. The outer six balls (each numbered 47) surround a central ball 46. Because of the packing of the spheres on the surface of rest 42 central ball 46, although of the same diameter as balls 47 will have its upper surface slightly elevated. To compensate a further rest similar to rest 28 in FIG. 5 may be provided in the centre of rest 42.

It is preferable that the upper surfaces of each of balls 44, 46 and 47 each bear the same amount of weight of the structure or upper seat they are supporting. Because either the balls themselves or the surfaces on which they rest are deformed when supporting the weight of the building this feature is not essential but it is preferable. Because either the balls or the surfaces on which they rest are deformed when supporting a weight if there is unequal distribution of the load between the balls this will be compensated for by the extra deformation of either the ball itself or the surface on which it rests.

For this reason it is not essential that there be an indented rest but this feature is advantageous.

The number of balls in the plurality is a matter of choice but could include from 2 to an upper limit determined by the size of the balls and the seats. Some assistance in choosing the number is to use the mathematical theories of close packing of spheres. Three and seven balls are preferred numbers, but the invention is not limited to these.

There are advantages in having a plurality of balls. Because the weight to be supported is distributed over a greater number of supporting members the devices can be used with heavier structures resting on them than if single balls were used. It is also possible to achieve a standardisation of components. Friction balls of a single size can be used in any application with any weight of structure. Where there was a heavier structure being supported there would be a greater number of balls doing the supporting.

In a domestic dwelling the sites chosen for installation may be piles or internal or perimeter foundation walls.

Because the concept of seismic isolation involves relative movement between the structure and the foundation it is necessary that a gap is left between the structure and the foundation and that there is sufficient room left for the travel of the structure relative to the foundation when seismic forces are acting upon the foundation beneath the structure.

When an array of friction balls are installed between a structure and its foundation and seismic forces hit the foundation the relative movement between the structure and the foundation will be occurring while the ball itself is deformed. The frictional forces within the ball will resist rolling and decelerate the relative movements before the ball has moved laterally beyond the edges of the seat. The relative motions will continue as long as the earthquake continues and the rolling resistance of the deformed frictional ball will continue to dampen the forces in the manner described.

The natural period of isolation in a particular direction is $$2\pi\sqrt{R/g}$$

where '$R$'=radius of curvature of the curved surface in that direction and at that position, and '$g$' is the acceleration due to gravity.

It will be appreciated by those skilled in the art that in designing friction balls the resistance to rolling of the friction ball in the conditions to be encountered when it is installed must be calculated such that the ball does not roll horizontally out of its seat and the structure collapse upon its foundation. The manner in which this is calculated is, for friction balls filled with particulate material and not prestressed, the coefficient of friction $\mu$, for friction, coulomb, or for plastic devices, $$\mu = 4 \tan \ominus$$

where $\ominus$ is the angle between an perpendicular line from the friction ball centre to the surface of deformation and the end of the deformation where the ball resumes its natural curvature as shown in FIG. 3.

Where the friction ball is made of solid material subject to elastic deformation, the elastic material theories described in H R Hertz, "Miscellaneous Papers" (*McMillan, London* 1896), Chapters 5 and 6 can aid in determining the coefficient of friction for a friction ball.

For plastically deformable solid friction balls this may be determined by the method described in Robinson and Truman, "Stress-Strain Curve for Aluminium for a Continuous Indentation Test", *Journal of Materials Science* 12 (1977), 1961–1965.

The invention has been described in relation to the use of friction balls for seismic isolation of structures from their foundations.

The friction balls can also be used in isolating different portions of the same structures or different structures from each other. For example, friction balls may be used wherever friction may be of service. One such example would be in rotating machinery where friction balls may be used as brakes or clutches.

Friction balls or deformable seat features according to the invention may be used in other applications. For example, they may be used in the seismic isolation of small industrial buildings. They may be used for damping vibrations owing to other sources. For example, they may be used to isolate machinery from structures in which the machinery is situated.

Other permutations or combinations within the scope of the invention as defined will also be apparent to those skilled in the art.

What is claimed is:

1. An external force damping bearing assembly for a structure, said assembly comprising:
   an upper surface which in use supports the structure,
   a lower surface co-operable with said upper surface, and
   a friction ball which in use is positioned between said upper surface and said lower surface to support said structure,
   said friction ball comprising a core of particulate material and an outer layer enclosing said core, said ball, when supporting said structure, being deformed, said deformation generating frictional forces between particles of said particulate material which resists rolling motion within said ball to dampen an external force applied to said lower surface or to said upper surface.

2. The bearing assembly as claimed in claim 1, wherein said external force is a seismic force acting on said lower surface.

3. The bearing assembly as claimed in claim 1, wherein said external force is a wind force acting on said upper surface through said structure.

4. The bearing assembly as claimed in claim 1, wherein said particulate material is a plurality of small friction balls of a construction and of diameters sufficiently small that a plurality of said friction balls fit within said core.

5. The bearing assembly as claimed in claim 1, wherein said particulate material consists of at least one of the following: sand, quartz, glass, steel, metal balls, spherical balls and non-spherical balls.

6. The bearing assembly as claimed in claim 1, wherein said core is filled to a hydrostatic pressure of up to 20 Mpa.

7. The bearing assembly as claimed in claim 1, wherein said outer layer comprises rubber.

8. The bearing assembly as claimed in claim 7, wherein said rubber outer layer is reinforced rubber.

9. The bearing assembly as claimed in claim 1, wherein said friction ball has a laminated construction comprising two or more laminae surrounding a central core.

10. The bearing assembly as claimed in claim 1, wherein said friction ball is spherical when it is not deformed by the weight it supports.

11. The bearing assembly as claimed in claim 1, wherein at least one of said surfaces is concave or conical.

12. The bearing assembly as claimed in claim 11, having a rest in said concave or conical surface or surfaces adapted to receive said friction ball.

13. The bearing assembly as claimed in claim 1, wherein said lower surface is mountable on a foundation member.

14. The bearing assembly as claimed in claim 1, wherein there are a plurality of said friction balls resting on said lower surface.

15. A method of seismically isolating a structure said method comprising the steps of:
   interposing a plurality of bearing assemblies,
   using an upper surface to support the structure,
   using a lower surface co-operable with said upper surface,
   positioning a friction ball between said upper surface and said lower surface to support said structure, and
   providing said friction ball with a core of particulate material and an outer layer enclosing said core, said ball, when supporting said structure, being deformed, said deformation generating frictional forces between particles of said particulate material which resists rolling motion within said ball to dampen an external force applied to said lower surface or to said upper surface between the structure and a predetermined number of foundation points upon which said lower surfaces are positioned.

* * * * *